(12) United States Patent
Berndt et al.

(10) Patent No.: US 9,644,116 B2
(45) Date of Patent: May 9, 2017

(54) METHOD AND MEANS FOR PROTECTING A WINDSHIELD FROM FURTHER DAMAGE BEFORE REPAIR IS POSSIBLE

(71) Applicants: Dieter R. Berndt, Reno, NV (US); John Wyaux, Reno, NV (US); Thomas R. Berndt, Reno, NV (US)

(72) Inventors: Dieter R. Berndt, Reno, NV (US); John Wyaux, Reno, NV (US); Thomas R. Berndt, Reno, NV (US)

( * ) Notice: Subject to any disclaimer, the term of this patent is extended or adjusted under 35 U.S.C. 154(b) by 284 days.

(21) Appl. No.: 14/270,232

(22) Filed: May 5, 2014

(65) Prior Publication Data

US 2014/0242317 A1    Aug. 28, 2014

Related U.S. Application Data

(60) Division of application No. 12/877,079, filed on Sep. 7, 2010, now Pat. No. 8,715,440, which is a
(Continued)

(51) Int. Cl.
| | |
|---|---|
| *B29C 73/00* | (2006.01) |
| *B32B 43/00* | (2006.01) |
| *B29C 65/00* | (2006.01) |
| *B32B 37/00* | (2006.01) |
| *B32B 38/04* | (2006.01) |

(Continued)

(52) U.S. Cl.
CPC ....... *C09J 7/0296* (2013.01); *B32B 17/10963* (2013.01); *B29C 65/4845* (2013.01); *B29C 73/10* (2013.01); *B32B 27/08* (2013.01); *B32B 2037/1253* (2013.01); *Y10T 428/1462* (2015.01); *Y10T 428/1471* (2015.01); *Y10T 428/1476* (2015.01); *Y10T 428/20* (2015.01); *Y10T 428/23* (2015.01)

(58) Field of Classification Search
CPC ........ C09J 7/0296; B29C 65/00; B29C 65/48; B29C 65/483; B29C 65/4845; B29C 63/00; B29C 63/02; B29C 63/22; B29C 73/00; B29C 73/04; B29C 73/10; B32B 17/10963; B32B 17/06; B32B 27/08; B32B 2037/1253
USPC ..... 156/60, 94, 99, 106, 108, 242, 246, 250, 156/256, 267, 272.2, 275.5, 289, 292, 156/307.1, 307.7; 428/40.1, 41.7, 41.8, 428/63, 68, 76, 98, 221, 343, 345, 352, 428/354
See application file for complete search history.

(56) References Cited

U.S. PATENT DOCUMENTS

| | | | |
|---|---|---|---|
| 2005/0087285 A1* | 4/2005 | Heien | B29C 73/10 156/94 |
| 2007/0209749 A1* | 9/2007 | Berndt | B29C 73/10 156/94 |

* cited by examiner

*Primary Examiner* — Philip Tucker
*Assistant Examiner* — Brian R Slawski
(74) *Attorney, Agent, or Firm* — John D. Long, Esq.; Long & Chybik

(57) ABSTRACT

The invention could be a windshield repair kit comprising a laminate having a protective barrier film, an adhesive layer, and a peel-able cover, the protective barrier film having at least one side to which the adhesive layer is applied, the adhesive layer being capable of cured in a presence of a UV light; the peel-able cover removably covering one or more exposed portions of the adhesive layer; a covering that removably receives the laminate, the covering reducing the transmission of UV light to the adhesive layer to a level that prevents the UV activation of the adhesive layer while the laminate is within the covering.

19 Claims, 4 Drawing Sheets

Related U.S. Application Data continuation-in-part of application No. 11/709,112, filed on Feb. 21, 2007, now abandoned.

(60) Provisional application No. 60/782,016, filed on Mar. 13, 2006.

(51) Int. Cl.
*B32B 9/00* (2006.01)
*B32B 33/00* (2006.01)
*B32B 3/26* (2006.01)
*B32B 1/04* (2006.01)
*B32B 3/02* (2006.01)
*C09J 7/02* (2006.01)
*B32B 17/10* (2006.01)
B32B 37/12 (2006.01)
B29C 65/48 (2006.01)
B32B 27/08 (2006.01)
B29C 73/10 (2006.01)

METHOD AND MEANS FOR PROTECTING A WINDSHIELD FROM FURTHER DAMAGE BEFORE REPAIR IS POSSIBLE

CROSS-REFERENCES TO RELATED APPLICATIONS

This application is a divisional of U.S. patent application Ser. No. 12/877,079, filed Sep. 7, 2010, now U.S. Pat. No. 8,715,440, which is a continuation-in-part of U.S. patent application Ser. No. 11/709,112, filed Feb. 21, 2007, now abandoned, which claims priority from U.S. Provisional Patent Application No. 60/782,016, filed Mar. 13, 2006.

STATEMENT REGARDING FEDERALLY SPONSORED RESEARCH OR DEVELOPMENT

Not Applicable

REFERENCE TO A "MICROFICHE APPENDIX"

Not Applicable.

FIELD OF THE INVENTION

The invention relates to means and methods for generally preventing and protecting motor vehicle windshields from further damage initially caused by impacts from flying objects. In particular, the invention relates to a clear protective barrier film affixed directly over the damaged area of a windshield.

BACKGROUND

Impact damage to windshields caused by flying debris or other objects has long been a subject of thriving windshield repair industry. Over 55% of windshield cracks or breaks are typically caused by impacts in the peripheral area within 4 (four) inches (approximately 10 cm) of the exposed periphery of a windshield; that is, within a margin measured from the molding to about 4 inches into the glass area. While impact damage can vary in size and shape, impact damage proximate to glass edge nearly always result in an edge crack that is a crack running through the impact point to the edge of the glass. These cracks can be quite long, that is over 5 inches in length and can eventually travel throughout a windshield.

By contrast, those impacts occurring in the middle area of the windshield quite often result only in the limited damage known as chips or stone damage that is a bulls-eye, a star break, a circular line break or a combination of either. These types of windshield damage generally do not immediately leave a long crack, but sometimes results in later evolution of a long crack. In such cases, either instantly or very soon (minutes or at most a few hours) after impact a long crack appears running through the impact point to the edge of the glass (called an edge crack) said long crack may be 1 to 12 inches long. Exceptions are extremely rare. Cracks from the top and bottom often proceed vertically for a short distance, then turn horizontally. Virtually all cracks formed from an impact in the vulnerable area extend to the glass edge. Cracks that extend to the glass edge open wider than cracks, which don't extend to the glass edge and usually have a tendency to travel faster.

As noted, small windshield damage in both the peripheral area and the central visual area, demand attention soon after the crack or break is formed to prevent the damage from becoming extensively larger. In the windshield repair profession, a clear polymer is injected into the crack and its solvent is allowed to evaporate out to cure and cross-link. A sharp instrument is then used to cut across the top of the cured polymer to bring it into alignment with the outside surface of the windshield.

Unfortunately, due to their small size and limited visibility impairment, such small cracks are often left unattended and unrepaired by the vehicle's owners (or not taken in for repair.) As such, limited repairable windshield damage, (due to addition windshield strikes; accumulation of dirt and debris in the crack or chip; or stress forces to which the windshield is subject; and like) may grow in size to the point wherein the windshield needs to be replaced. This replacement creates an increase in costs (higher replacement costs vs. lower minor repair costs) to the consumer and their insurance carriers (who may pass such increase in costs back onto the consumer in the form of higher premiums.) Further, such possibly salvageable damaged windshields (which are otherwise considered unrecyclable) are now sent to landfills upon completion of the replacement procedure to further contribute to our environmental waste problems.

To try to address such issues, some have provided a temporary windshield repair means and methodology whereby the non-professional repairer (e.g., car owner) could apply a clear laminate cover means, comprising of clear plastic tape/film with adhesive on one side (with a corresponding pull-off tab covering the adhesive side) to the chip or crack. Once the pull-off tab is removed, the adhesive side of the tape/film is applied to the surface of the windshield covering the crack or chip. Generally, such laminate cover means may employ solvent-cured adhesive.

The limitations of such a product (in having a film covering or sandwiching the adhesive/solvent between windshield and the film) could be that such covering does not allow the solvent to fully evaporate. Such a product, when applied, generally could result in having the adhesive in a non-full cured and flexible state. As such, the film as applied would not only lack the ability to provide full adhesion of the film to the window shield but it further lack the ability to give an integral, rigid structural integrity to the film-windshield combination. Such a product could generally lack ability (e.g., rigidity) provide to help prevent the crack from getting bigger (e.g., due to stresses and strains applied to the windshield, subsequent impacts to area of the crack/chip, and alike.)

What is needed therefore is a temporary windshield repair/adhesive laminate means and methodology apparatus and means by which the owner/driver of the vehicle may apply to the small crack or chip of windshield utilizing cross-linking polymer adhesive that cures without the use of an evaporative solvent, to provide substantial cross-linking capability providing an integral, rigid substrate connection between the flexible film and windshield that substantially resists forces and subsequent impacts proximate to the chip or crack to generally prevent the chip or crack from growing in size until permanent windshield repairs can be effected.

SUMMARY OF ONE EMBODIMENT OF THE INVENTION

Advantages of One or More Embodiments of the Present Invention

The various embodiments of the present invention may, but do not necessarily, achieve one or more of the following advantages:

the ability to rigidly connect a clear flexible film covering a crack or chip to a windshield sporting such crack or chip;

provide a laminate-based, temporary windshield repair using a UV-curing adhesive that rigidly connects a flexible film to a windshield;

the ability to bond a flexible film in a rigid manner to windshield to prevent the crack or chip covered by the film from growing in size;

to provide a temporary windshield repair means that may resist various forces and impacts upon the windshield from increasing in size a chip or crack present on the windshield;

the ability to form a temporary combination of flexible film, adhesive substrate, and windshield that prevents a crack or chip present in windshield from increasing in size; and to provide temporary windshield repair laminate having a adhesive layer that provides a flexible film covering a chip or crack to a windshield with rigid substrate that resists forces, which may otherwise increase the size of the covered chip or crack.

These and other advantages may be realized by reference to the remaining portions of the specification, claims, and abstract.

BRIEF DESCRIPTION OF ONE EMBODIMENT OF THE PRESENT INVENTION

One possible embodiment of the invention may be a methodology of preventing a vehicle windshield against further damage from an existing crack or break in the vehicle windshield comprising of the following steps, providing a laminate with comprising of a barrier film having, said barrier film having at least one side with a UV-cured adhesive applied to it, a peel-able cover reversibly applied over the adhesive; providing a windshield with at least a small crack or chip in its surface; applying the barrier film to the windshield in a manner to cover the crack or chip so that the adhesive comes in contact with the windshield; and forming the adhesive into a rigid substrate connection between the barrier film and the windshield that resists various forces acting upon the windshield that otherwise would increase the size of the crack or chip.

Another possible embodiment of the invention could be laminate used for temporary windshield repair comprising of a clear, UV-permeable barrier film having at least one side, the one side having an adhesive applied to it, the adhesive being UV cured, and a peel-able cover reversibly applied over the adhesive.

The above-description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DETAILED DESCRIPTION

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Figure 1:
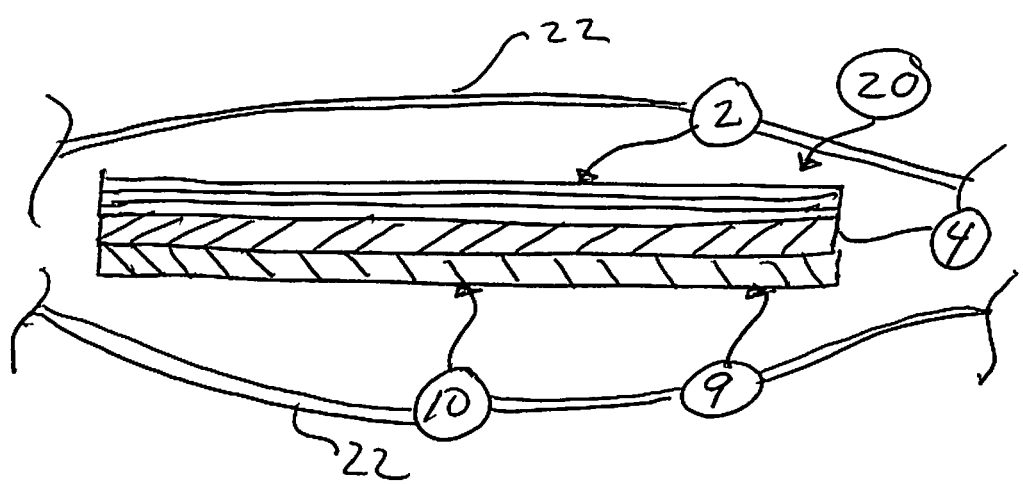
FIG. 1 substantially shows a cross-sectional view of the invention as laminate comprising of a protective film barrier, an adhesive layer and peel-able cover.
Figure 2:
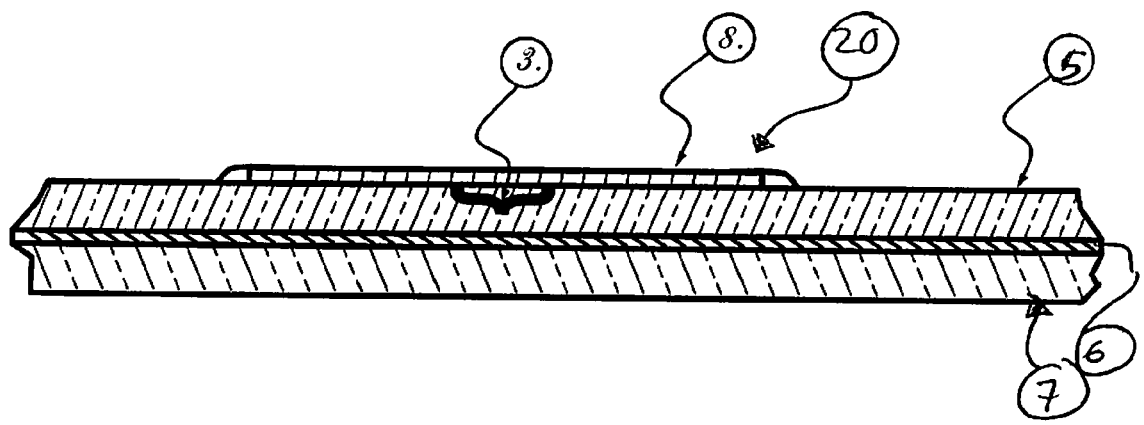
FIG. 2 substantially shows a cross-sectional view of a windshield segment wherein a resinous fluid forms a clear protective barrier film after it is applied over a crack or break on the surface of said windshield.
Figure 3:
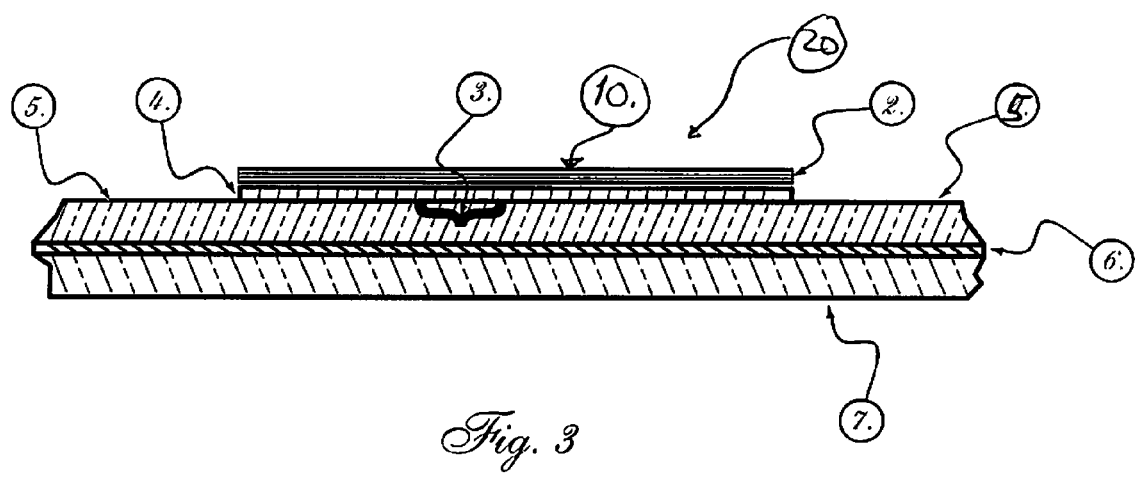
FIG. 3 substantially shows a partial cross-sectional view of a windshield segment with the clear protective barrier film after it is applied over a crack or break on the surface of a windshield.

As substantially shown in FIGS. 1-3, the invention 20 may be a methodology and means for temporarily protecting windshields 1 from further fracture of an existing crack or break 3. Such a windshield 1 could be of a safety-glass type comprising of an outside portion 5 bonded to inside portion 7 by plastic laminate 10.

As substantially shown in FIG. 1, the invention 20 could be a laminate 10 of comprising of clear, flexible, UV-permeable barrier film 2, an adhesive layer 4 located on one side of the film 2, and a peel-able cover 9 generally covering the exposed portion of the adhesive 4. The laminate 10 maybe formed into any desired size and geometric shape with the operator (not shown) possible cutting down (e.g., with scissors—not shown) the laminate 10 to a desired shape and size for a particular application. One possible laminate configuration could have the laminate 10 be a circular shape with a diameter of 0.5 to 5 inches. Another possible laminate configuration could be a rectangular shape with rounded corners whose sides are also 0.5 to 5 inches.

Plastic barrier film 2 could vary in thickness, tensile strengths, and rigidity, using various plastic formulations known to those skilled in the art. Selection by one knowledgeable in the art of a film whose thickness and plastic formulation to generally provide for good surface adhesion and rigidity in combination with the adhesive to prevent and/or restrict the current damage site from current windshield stress forces and addition impact(s) which would allow a crack or break to become larger. In practice, the selected material should prevent any such further damage, even for a little chip break because as experienced in a real situation, a chip in the vulnerable peripheral area commonly leads to an edge crack. In order to minimize distortion of visibility through the film, the film must be optically clear and should be as thin as possible consistent with achieving the break arresting goal (e.g., should be in the range of 2-12 mils in thickness depending upon the application.)

The plastic barrier film is to be selected from a UV-permeable material that is optically clear and crack resistant and will not fog or discolor over time due to sunlight or severe weather conditions. The importance is optically clarity with no image distortion caused by the film material. It is desired that the film does not add to the visual distraction to a driver of a vehicle to the existing windshield crack or break.

The film could be can be a single-ply of film or a laminated multi-ply, more preferably 2-10 ply. Such ply films have a preferred thickness range of 4-12 mils, more preferably 7-8 mils, the most preferred thickness being 5 or 6 mils. The range of 4-12 mils thick is preferred when used with both flat and bowed windshield surfaces (the term bowed refers to curvature in the planar surface or body of the windshield, this term being used to distinguish over the term curved as related to the peripheral lines of a windshield). Sometimes bowing is a compound curvature, the windshield being bowed both horizontally and vertically. In the case of bowed surfaces, the film thickness at 10-12 mils may be too stiff when applied to bowed surfaces while the 4-8-mil range is not too stiff. The most preferred thickness is 5 and 6 mils. These thickness designations refer to the nominal measurements provided by manufacturers of plastic film. The film thickness is also very important to reduce any obstruction to the windshield wiper blades.

Polyester films exemplary of the above description and having been used successfully on racing car windshields are made by MADICO, Inc., Woburn, Mass. as its product designations LCL-600-XSR and LCL-800-XSR and a 5-7 mil film sold by that company.

The adhesive layer could comprise of a liquid resin is a made from a plastic polymer formulated from an acrylic or silicone base compound, which may include photo initiators which will tend to cure the applied resin very quickly when it is exposed to UV light. The cured adhesive could provide a rigid subtract that in connecting the film to the windshield could further to form a barrier film-adhesive substrate combination that substantially augments the film's rigidity and surface tensile strength. One such adhesive could be UV CURE 7155 from Epoxies Etc., Deco-Coat Product Line, 21 Starline Way, Cranston, R.I. 02921.

The peel-able cover, could be of suitable film that generally has low adhesive qualities when in contact with the selected adhesive.

Figure 1A:
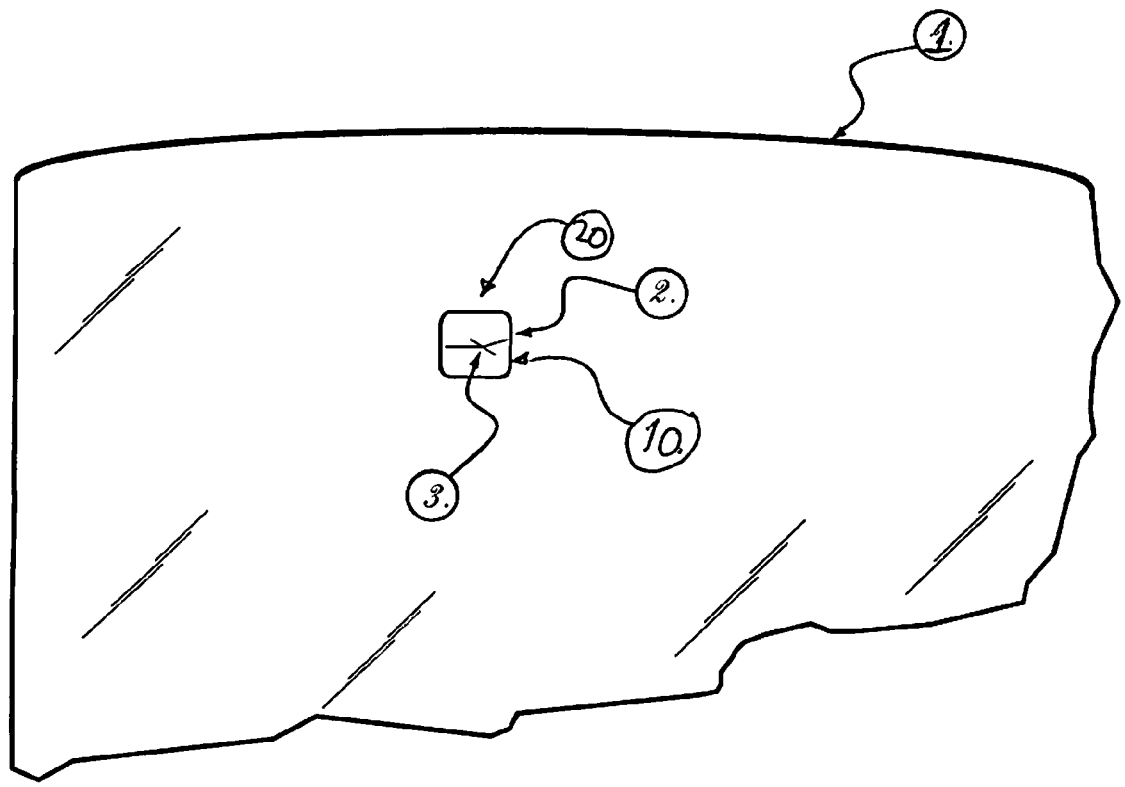
FIG. 1A substantially shows a front outside view of a windshield having the barrier film applied in an exemplary user application over a linear crack.

Referring to FIG. 1A, an automobile windshield 1 having a break or crack 3 in the windshield could be a subject of the invention 20. The laminate 10, after being sized and shaped by the operator (not shown) for the particular application, may have its peel-able cover 9 removed. The adhesive side of the film 2 may then be placed and centered onto the break or crack 3. The UV light (such as sourced from the sun) could travel through the film 2 into the adhesive and active it (cure it) to cause it to cross-link into a rigid substrate that forms with the film a barrier film-adhesive substrate combination that not only binds the film 2 to the windshield 1, but significantly increasing the film's own rigid and tensile surface strength qualities to substantially allow it, in combination with the windshield, to resist present forces and future impacts upon the windshield from further increasing the size of the break or chip. The barrier film-adhesive substrate combination generally has the tensile strength to hold the break or crack and keep it from getting larger due to changing temperature and/or shocks and vibration or other forces acting upon the windshield and will further protect the break from collecting moisture and debris of any type. Additionally, the optical clarity of the barrier film-adhesive substrate combination generally should not become a visual distraction to the driver. Additionally, the affixed barrier film-adhesive substrate combination can be periodically removed and replaced with a new barrier film-adhesive substrate combination, should the film becomes damaged, worn, or loses its clarity.

FIG. 2 shows an alternate form of the invention 20 wherein a resinous fluid placed upon the windshield 1 forms a clear protective barrier film 8 after it is applied over a crack or break 3 on the surface of said windshield 1. The plastic polymer resin can be formulated from an acrylic or silicone base compound which may include photo initiators which will tend to cure the applied resin very quickly when it is exposed to light. Said photo initiators may be sensitive to either the ultraviolet, infrared or visible part of the light spectrum.

It is appreciated that application of a vibration and shock absorbent film or other protective barrier placed over an existing windshield break or crack may have to be different from that at the top and sides in many vehicles. This is because of the peculiar construction of some vehicles at and adjacent the bottom of the windshield. In certain cases the bottom of the windshield 1 is under the level of the hood, and sometimes has as much as two inches of protection is afforded from the hood. The molding will be below the hood line. In such cases exposure of the windshield to damage begins at the level of the hood. That is, below the hood, it is not expected to see much damage. Thus, the vulnerable area is defined as beginning from the hood line, where the windshield 1 extends below the hood line.

In another aspect of the invention 20 could be a covering 22 which can be used to reversibly encapsulate the laminate 10 to prevent premature activating or curing of the adhesive 4 by daylight-generated UV light. Such a covering 22 could be a small business card size kit, bearing indicia that would be useful for marketing and promotional applications. The laminate 10 could be prepared with peel-able 5-6 mil optically clear self-adhesive geometrically die cut polyester protective barrier film 2. The kit could be designed to be universal for application and convenient to be applied on any windshield. It literally becomes as simple and analogous to apply the invention 10 onto a windshield break as placing a band-aid on a human's scratch or wound. The kit will be conveniently sized to be a business card on one side, with instructions and several shapes of peel-able protective barrier film on the other side. Said shapes to be applicable to cover virtually any break or crack on a damaged windshield 1.

It is further stressed that invention 20 should be successful as a protective barrier include those which can be applied with the utmost convenience by any driver and will have the ability to withstand a further impact and prevent vibrations from reaching the damaged part of the windshield. Said film and cured adhesive shall have the ability of having planar rigidity which will provide the tensile strength to resist the expanding forces within the break or crack. This is accomplished by keeping said break or crack from spreading or getting larger while said film/adhesive combination is absorbing vibrations and thermal stresses. Said combination will have different thickness and tensile strengths as provided by polymeric materials, such as polycarbonates, polyesters and poly-urethanes having good optical and visual clarity. Thin, 2-8 mil thick optically clear tempered glass or crystal may also be used instead of the plastic material as well as multi-layered combinations of each.

CONCLUSION

Although the description above contains many specifications, these should not be construed as limiting the scope of the invention but as merely providing illustrations of some of the presently preferred embodiments of this invention. Thus, the scope of the invention should be determined by the appended claims and their legal equivalents rather than by the examples given.

We claim our invention as:

1. A windshield repair kit comprising:
   a) a laminate having a protective barrier film, an adhesive layer, and a peel-able cover, the protective barrier film having at least one side to which the adhesive layer is applied, the adhesive layer being formulated from an acrylic or silicone base compound comprising one or more types of photo initiators, the acrylic or silicone base compound being configured to be cured in a presence of a UV light; the peel-able cover being configured to removably cover one or more exposed portions of the adhesive layer, and
   b) a covering being configured to removably receive the laminate, the covering being further configured to reduce a transmission of the UV light to the adhesive layer to a level that prevents a UV activation of the adhesive layer while the laminate is within the covering.

2. The kit of claim 1 wherein the adhesive layer when applied to a damaged portion of a windshield and subsequently exposed to UV light is configured to form a rigid substrate with a tensile strength that attaches the protective barrier film to the windshield in a manner that resists one or more forces acting upon the windshield that otherwise would increase the size of the damaged portion.

3. The kit of claim 1 wherein the protective barrier film is UV light transparent.

4. The kit of claim 1 wherein the protective barrier film has a thickness ranging between 2-12 mils.

5. The kit of claim 1 wherein the protective barrier film is thin enough not be an obstruction to windshield wiper blade movement.

6. The kit of claim 1 wherein the protective barrier film has optic clarity with no image distortion.

7. The kit of claim 1 wherein the protective barrier film is a polyester film.

8. The kit of claim 1 wherein the protective barrier film is a single-ply film.

9. The kit of claim 1 wherein the protective barrier film is a laminated multi-ply film having a range of 2-10 ply.

10. The kit of claim 1 wherein the protective barrier film is flexible prior to the adhesive layer being cured by the UV light.

11. The kit of claim 1 wherein the adhesive layer after being cured by the UV light is optically clear.

12. The kit of claim 1 wherein the peel-able cover has low adhesion qualities when in contact with the adhesive layer.

13. The kit of claim 1 wherein the laminate has a circular shape with a diameter ranging between 0.5 inches to 5 inches.

14. The kit of claim 1 wherein the laminate has a rectangular shape with rounded corners, a length of respective opposing sides of the rectangle having a range from 0.5 inches to 5 inches.

15. The kit of claim 1 wherein the UV light is daylight-generated UV light.

16. The kit of claim 1 wherein the covering is sized to removably contain several laminates.

17. The kit of claim 16 wherein the several laminates comprise laminates of different shapes.

18. The kit of claim 1 wherein the covering displays marketing or promotional indicia.

19. The kit of claim 1 further comprising instructions on how to use the laminate.

* * * * *